Patented Apr. 2, 1946

2,397,865

UNITED STATES PATENT OFFICE 2,397,865

PROCESSES OF COLOR PHOTOGRAPHY AND ELEMENTS THEREFOR

Andrew B. Jennings, New Brunswick, N. J., assignor to E. I. du Pont de Nemours & Company, Wilmington, Del., a corporation of Delaware No Drawing. Application March 31, 1944,
Serial No. 528,943

12 Claims. (Cl. 95—7)

This invention relates to color photography and more particularly to hydrophilic color-yielding compositions and layers. Still more particularly it relates to photographic elements bearing at least one color-yielding layer composed of a dye intermediate ether of polyvinyl alcohol. The invention also relates to processes of color-coupling development utilizing such elements.

This invention has for an object the preparation of new color-yielding compositions. Another object is to provide photographic elements with hydrophilic layers composed of dye intermediates capable of color-forming development. A related object is to provide hydrophilic color-yielding polymers which can be used alone as dispersing and binding agents for silver salts. A further object is to provide dye intermediates, vinyl alcohol polymers and their substitution derivatives.

Still other objects include the preparation of silver halide dispersons in hydrophilic dye intermediate ethers of polyvinyl alcohols, the coating of such dispersions onto supports and process of color photography utilizing the resulting elements. A further object is to provide multilayer photographic elements which have good speed and supply a high degree of dye intermediate concentration which yields a maximum color density per molecule of silver halide reduced on development.

The novel color-yielding photographic elements of this invention consist of a support bearing at least one layer composed of a hydrophilic ether of a dye intermediate with a polyvinyl alcohol. The ethers consist of two chemically joined components (1) dye intermediate nuclei and (2) a polyvinyl alcohol nucleus, each dye intermediate nucleus being joined through a single oxygen atom to the polyvinyl alcohol carbon chain. Each molecule of polyvinyl alcohol has a plurality of dye intermediate nuclei attached thereto through ether linkages.

The elements may contain light-sensitive silver salts in the dye intermediate layer or in operative contact therewith. The preferred elements however, have light-sensitive silver salts intimately dispersed through the dye intermediate layers.

A class of ethers which is especially useful for the color-yielding elements comprises the dye intermediate substituted alkyl ethers of polyvinyl alcohol wherein the dye intermediate components have the general formula; R—alk—O— in which R is a dye intermediate nucleus, "alk" is a divalent saturated aliphatic nucleus. The oxygen atom of the ether component is in turn attached to a carbon atom of the polyvinyl alcohol polymer chain. In the resulting products, the dye intermediate nuclei constitute an integral part of the polymer which means that they are chemical entities as distinct from physical mixtures of dye intermediates and colloids. This eliminates difficulties arising from different solubilities and compatibilities of such separate compounds.

The hydrophilic dye intermediate ethers used in this invention can be advantageously prepared by an etherification reaction of a dye intermediate nucleus with a vinyl alcohol polymer. Dye intermediates containing a reactive group attached to a non-aromatic hydrocarbon group, such as a hydroxyl group or a halogen atom, e. g., chlorine, may be condensed with the vinyl alcohol polymer or a bifunctional connecting agent such as an aldehyde, e. g., formaldehyde, acetaldehyde, benzaldehyde, etc may be employed. The dye intermediate components should be used in such an amount that a plurality of ether groups are introduced into each molecule of the vinyl alcohol polymer.

By dye intermediates or color-formers are meant nuclei containing groups which are capable of coupling with the oxidation products of color coupling aromatic primary amino developing agents formed on development of silver salts images to form a quinoneimine (including indamine, indoaniline and indophenol) dye or an azomethine dye. These dye intermediate nuclei are also capable of coupling with diazotized aromatic amines to form azo dyes.

Nuclei of the above type are well known in the dye art and color photography art. They are sometimes called color-formers, coupling components, etc.

These dye intermediate nuclei have as the active coupling groups a structure which may be represented as

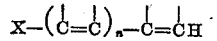

where X is HO— or RHN—, where R is H or a saturated aliphatic group, e. g., methyl, ethyl, beta-hydroxyethyl, B-chlorethyl, benzyl, dodecyl, etc., and $n$ is 0 or 1. This group is found in the reactive methylene dye intermediates and in aromatic hydroxyl and amino compounds and includes the reactive ethenol, aminoethyl, 4-hydroxy- and 4-amino - 1,3 - butadienyl groups. These groups occur in phenols, naphthols, anilines, naphthylamines, acylacetamides, cyanoacetamides, beta-ketoesters, pyrazolones, homophthalimides, coumaranones, indoxyls, thioindoxyls, etc.

The reactive ethanol group represented by $$HO-\overset{|}{C}=CH-$$

occurs in phenols and naphthols which couple in the ortho position and in the alkali soluble or enol form of most reactive methylene dye intermediates. These reactive methylene groups have a hydrogen rendered mobile by the proximity of certain unsaturated groups such as for example $$-\overset{|}{C}=O, -\overset{|}{C}=N-, -C\equiv N$$

and others. The —CH$_2$— group is usually present between two such groups, for example, —COCH$_2$CO—, COCH$_2$CN, $$-COCH_2\overset{|}{C}=\overset{|}{N}$$

in a cyclic or acyclic system.

The reactive aminoethenyl group, $$RHN-\overset{|}{C}=CH-$$

occurs in aromatic amino compounds which couple in the ortho position.

The 4-hydroxy- and 4-amino-1,3-butadienyl groups represented as $$HO-\overset{|}{C}=C-\overset{|}{C}=CH$$

and $$RHN-\overset{|}{C}=C-\overset{|}{C}=CH$$

occur in phenolic, naphtholic and aromatic amino compounds which couple in the para position.

In all of these dye intermediate groups the hydrogen atoms in the coupling reactive position may be replaced by groups readily eliminated in the coupling reaction, e. g., halogen, sulfonic acid, carboxylic acid, etc.

In a preferred method of preparing these dye intermediate ethers, vinyl alcohol polymer containing the group (—CH$_2$—CHOH—)$_n$ in which $n$ is at least 100 and a dye intermediate or color former are linked by condensation with formaldehyde-yielding material to yield a hydrophilic polymeric color former of the following general structural formula:

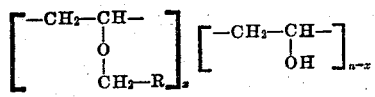

wherein R is a dye intermediate nucleus, $x=\frac{1}{100}n$ to $\frac{3}{10}n$. The formaldehyde may be added to a solution or suspension of the polyvinyl alcohol and the dye intermediate in the presence of a catalyst or, preferably, it may be condensed with the color-forming nucleus first to form a methylol compound which may in turn be condensed with the polyvinyl alcohol, or alternatively the methylol derivative of a polyvinyl alcohol can be first formed and condensed further with the color former or dye intermediate.

By polyvinyl alcohols as used in preparing the color-forming binding agents of the present invention is meant the hydroxyl polymers known in the art prepared by polymerizing a vinyl ester, e. g., vinyl acetate, vinyl chloracetate, vinyl propionate, vinyl butyrate, etc., followed by partial or complete hydrolysis and if desired by further reaction to introduce minor portions of other modifying groups, e. g., acetal, ester or ether groups, etc. Hydrolyzed interpolymers of vinyl esters with minor (3.0% or less by weight) portions of other vinyl compounds, e. g., vinyl chloride, alkyl acrylates, methacrylates, etc., are often useful in preparing the hydrophilic dye intermediates, especially where a lower degree of water solubility is desired. Such compounds have a straight chain consisting solely of —CH$_2$— and —CHOR— groups in equal number where R is mainly H. All of the products useful in preparing the color-forming ethers of the present invention have the group —CH$_2$—CHOH— representing at least 50% of the polymer chain; i. e., for every 100 chain atoms there are at least 25 hydroxyl groups. Further, it is preferred that the final dye intermediate ethers themselves contain at least 12.5 hydroxyl groups for every 100 chain atoms, and that the polymer consists of at least 25% (—CH$_2$—CHOH—) groups so that they will have the desired permeability-solubility characteristics as herein defined. It is also preferred that between 1 and 30 color-forming ether groups shall be present for each 100 chain atoms. The preferred hydrophilic dye intermediate ethers are highly polymeric (that is, they have a polymer chain in excess of 200 carbon atoms), and form strong unsupported films when dry. In addition, it is preferred that these hydrophilic dye intermediate polyvinyl ethers are not dissolved by cold water (20° C.) but are soluble to the extent of at least five parts in 100 parts of boiling water or a boiling mixture of water containing less than 50% of a water-miscible organic solvent and preferably less than 25% of ethanol.

The above limitations enable the dye intermediate ethers hereof to meet the rigorous demands required of the dispersing and binding agents used in preparing light-sensitive elements containing silver salts and related color-yielding elements. These hydrophilic dye intermediate ethers possess a unique combination of properties among which may be mentioned (1) ability to form strong, coherent, unsupported films, (2) ready permeability to water and photographic processing solutions at temperatures in the neighborhood of 20° C., (3) insolubility and freedom from softening in water at moderate temperatures, (e. g. below 30° C.), (4) transparency and freedom from color, (5) a relatively high softening point (e. g. above 50° C.), (6) adequate solubility in solvents, e. g., water, ethanol, etc., for coating, (7) freedom from adverse action on radiation-sensitive silver salts, (8) ability to disperse, prevent coagulation and sedimentation of silver salts.

The hydrophilic polymeric ether color formers of the present invention, when associated with light-sensitive silver halides, combine not only the above properties but, in addition, function as chromogens. In fact, the number of color-coupling groups in the polymer can be controlled so as to contribute not only adequate color-forming capacity but also a portion of the desired solubility/permeability balance required for a satisfactory carrier for the light-sensitive material.

The introduction of dye intermediate ether groups in controlled amounts usually reduces the water solubility somewhat. However, if the color-forming group contains a solubilizing group, the solubility of the final product may be increased slightly. It is often satisfactory merely to balance the dye intermediate ether groups and hydroxyl groups in the correct ratio to secure the ideal permeability and film properties. If in any one polymer the color former substitution which gives the optimum color on chromogenic development does not yield the desired solubility, this is corrected by the introduction of other groups such as acetal, ether or ester groups designed to have the proper solubilizing or insolubilizing effect. For instance, acetal formation with benzaldehyde decreases water solubility while with o-sulfobenzaldehyde water solubility is increased.

Color-yielding compositions can advantageously be made by dissolving the novel hydrophilic polymeric dye intermediate ethers of polyvinyl alcohol and its substitution derivatives in a solvent therefor. Suitable solvents include water containing 20% of a water miscible volatile solvent, e. g., methanol and ethanol. A water soluble inorganic halide can be incorporated in the solution of the dye intermediate and a solution of a water soluble silver salt, e. g., silver nitrate added. Silver halides are precipitated in the hydrophilic dye intermediate whereby a light-sensitive colloid composition is formed. The resulting composition can be further treated to improve the light-sensitive properties of the composition, e. g., it can be coagulated, washed, ripened, freed from excess soluble salts, adjusted to correct pH and dilution, and then coated. Various types of sensitizing dyes, which modify the spectral sensitivity of the resulting emulsion, can be added if desired. Similarly emulsion sensitizers, antifogging agents, preservatives, hardeners and/or other emulsion constituents can be added at various stages prior to coating. The final solution can be coated on to a support in the same manner that a gelatino-silver halide emulsion is coated. After drying the resulting element can be exposed and processed to colored images in the same way that a film containing gelatino silver halides, color former layers can be processed. Solutions of the hydrophilic polymeric dye intermediate ethers of polyvinyl alcohols described above which are free from light-sensitive silver salts, can be coated adjacent to or in operative contact with a silver-halide layer on a support and dried.

The degree of substitution of the dye intermediate nuclei in the polymer is capable of wide variation, depending upon the reactants and the reaction conditions. However, it is preferred to use those having a relatively high percentage of dye intermediate nuclei, as herein before described, since these produce the maximum color density obtainable from the amount of silver salt reduced by the color developer. This permits the use of water-permeable light-sensitive layers having the minimum quantity of silver halide. In fact, this is one of the important advantages of the invention since, in a multilayer film, the lower layers, i. e., furthest from the exposure source, receive only light passing through the upper layers. Thus the less silver halide these upper layers contain, the less scattering of light there is and the more light passes through to the lower layers. The multilayer films provided by this invention contain a higher percentage of color-forming nuclei than is possible to attain by adding insoluble or high molecular weight dye intermediates to gelatin-silver halide emulsions and permit the preparation of a film having higher overall sensitivity and a higher degree of definition and resolution than is obtainable in gelatin-silver halide films.

The invention will be further illustrated but is not limited by the following examples wherein all temperatures are centigrade, all parts are by weight, and all solutions aqueous unless otherwise indicated and all operations wherein light-sensitive materials are used are conducted in the dark and under conditions which will not expose or cause fogging of the sensitive silver salts.

Example I

A mixture of 100 parts of saligenin, 100 parts of polyvinyl alcohol obtained by completely hydrolyzing polyvinyl acetate and having a solution viscosity (4% in water) of 18–24 centipoises at 20°, 400 parts of dioxane and 2 parts of 85% phosphoric acid is stirred at 80° for 6 hours, then diluted with 1000 parts of acetone and filtered. The solid material is extracted for 12 hours with acetone, and then dried to give 119 g. of a white, color-forming polymer having the following probable color unit structure:

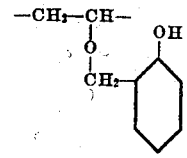

The gain in weight indicates a substitution of 8% of the hydroxyl groups i. e. 16 out of every 100 chain atoms contains a color-forming group. Ten parts of this powder is dissolved by stirring in 90 parts of 20% ethanol-water at 80° for one-half hour. To 40 parts of this solution is added 40 parts of water, 5 parts of 1% sodium dodecyl sulfate, and 5 parts of concentrated ammonia water. The mixture is stirred at 45° while adding 20 parts of 3N silver nitrate and 23 parts of 2.92N ammonium bromide—0.08N potassium iodide simultaneously during 5 minutes. After stirring a total of one-half hour at 45°, the silver halide dispersion is allowed to cool and mixed with 100 parts of acetone which precipitates the binding agent containing the dispersed light-sensitive silver halides. The precipitated polymer mass containing the silver halide is washed for one-half hour in running water to remove the soluble salts, then the remaining 60 parts of the original polymer solution is added, together with 25 parts of ethanol and 1 part of 10% postassium bromide and the whole mixture stirred at 58° for one-half hour after which it can be used directly or stored. This light-sensitive solution is coated on paper or cellulose acetate film base and exposed to a colored object. It is then developed in the following solution:

| | Parts |
|---|---|
| p-Aminodiethylaniline hydrochloride | 2 |
| Sodium sulfite | 3 |
| Sodium carbonate | 20 |
| Water to make | 1000 | made by dissolving the constituents in 500 parts of water and diluting the solution to 1000 parts, washed, bleached in 4% potassium ferricyanide and fixed in 25% sodium thiosulfate solution. The resulting film and paper contains a strong blue-green negative image.

Example II

A solution of 200 parts of phenol and 400 parts of 20% sodium hydroxide is cooled to 15° and mixed with 60 parts of 37% formalin solution and let stand at 25° C. for 60 hours. The solution is then almost neutralized by adding 100 parts of concentrated sulfuric acid the mixture being kept at 20° by addition of ice. The phenolic compounds are separated from the aqueous fraction by extraction with ether. The ether extracts after washing and drying are evaporated under reduced pressure at 20° and added to a mixture of 100 parts of polyvinyl alcohol of the type used in Example I and 300 parts of dioxane containing 5 parts of 85% phosphoric acid. The mixture is stirred for six hours at 80° diluted with 1000 parts of acetone, filtered and extracted with acetone for 12 hours to yield 120 parts of a white powder soluble in boiling 10–50% ethanol. A solution is prepared by stirring 10 parts of this material which contains the same structural units as in Example I in 90 parts of 20% ethanol at 80° for one hour. To 40 parts of this solution is added 40 parts of water, 5 parts of 1% sodium dodecyl sulfate, and 25 parts of 2.92N ammonium bromide-0.08N potassium iodide as in Example I. The mixture is stirred at 45° while adding 10 parts of ammoniacal 3N silver nitrate, then after stirring 15 minutes at 45°, 10 parts of 3N silver nitrate is added and the mixture stirred at 45° for 15 minutes. The dispersion is then cooled to 30° and precipitated by adding 75 parts of 20% sodium sulfate solution. The precipitated light-sensitive composition is washed for 1 hour in distilled water then the remaining 60 grams of the original polymer solution is added together with 20 parts of ethanol and 1 part of 10% potassium bromide and the whole mixture stirred at 60° for one-half hour. The product is then coated on a cellulose nitrate film base and exposed and processed as in Example I to yield similar results.

*Example III*

A mixture of 15 parts of polyvinyl alcohol similar to that of Example I, 30 parts of 2-hydroxy-3-methyl-5-chlorobenzyl alcohol (prepared from formaldehyde and p-chloro-o-cresol) 80 parts of dioxane and 2 parts of 85% phosphoric acid are stirred at 80° for 2 hours and then 5 cc. of acetic anhydride is added and the stirring continued for 1 hour at 80°. The product formed, namely, the partial 2-hydroxy-3-methyl-5-benzyl ether of polyvinyl alcohol, is washed and extracted with acetone, dried and coated to form an element in the manner described in Example I. Upon exposure and development in like manner, the resulting films and paper contain a brilliant blue-green negative dye image.

*Example IV*

When 250 parts of o-phenylphenol is used in place of the phenol in the procedure of Example II, a similar ether is formed. Ten parts of the resulting 5% substituted white o-hydroxydiphenyl methyl ether of polyvinyl alcohol is dissolved in a mixture of 50 parts of water and 50 parts of ethanol at 80° C. This solution is used in the preparation of an emulsion by the method of Example I. The resulting light-sensitive composition is coated on a white photographic paper and processed as in Example I to yield a bright greenish-blue negative dye image.

*Example V*

A mixture of 42 parts of alpha-naphthol, 105 parts of dioxane, 1 part of 85% phosphoric acid, 5 parts of decolorizing charcoal and a small amount of sulfur dioxide is boiled and filtered, then mixed with 22 parts of polyvinyl alcohol having a solution viscosity (4%) of 20 centipoises at 20°, 11 parts of o-sulfobenzaldehyde, 1 part of 85% phosphoric acid, 50 parts of dioxane, and stirred for one-half hour at 70°. Then 7.5 parts of paraformaldehyde is added, and stirring at 70° C. continued for two hours. The mixture is diluted with 500 parts of acetone, filtered and extracted with acetone. This product formed is a 1-hydroxy-2-naphthyl ether having approximately eight color-forming groups per 100 hydroxyl group and is used as in Example II in the preparation of a light-sensitive coating composition. After coating this dye intermediate ether on a cellulose acetate film base and exposing and processing it as in Example I, bright blue negative dye images are obtained.

*Example VI*

A mixture of 22 parts of polyvinyl alcohol similar to that of Example V, 20 parts of o-sulfobenzaldehyde, 100 parts of dioxane, and 2 parts of 85% phosphoric acid is stirred at 80° for one-half hour. Then a mixture of 45 parts of phenylmethylpyrazolone and 7 parts of paraformaldehyde which had been heated to 70° is added and the mixture stirred for 2 hours at 75°, then washed with acetone and extracted. The resulting light tan powder, a mixed 1-phenyl-3-methyl-5-ketopyrazyl ether/benzaldehyde-o-sulfonic acid acetal of polyvinyl alcohol is hydrophilic but soluble in hot 20% ethanol. A light-sensitive composition is prepared from the dye intermediate ether and coated as in Example I and after exposure to an object and processing the coated paper and films according to that example, brilliant magenta negative dye images are obtained.

*Example VII*

A mixture of 56 parts of o-chloroacetonacetanilide, 50 parts of 37% formaldehyde solution, 100 parts of 50% alcohol, and 2 parts of concentrated hydrochloric acid is warmed together at 50° C. for one hour, cooled, diluted with water, decanted, washed with water, dried, and dissolved in 200 parts of dioxane. To this solution is added 22 parts of polyvinyl alcohol similar to that of Example V and 2 parts of phosphoric acid and the mixture stirred at 80° C. for 2 hours. The product, a polymeric ether of the following probable color unit structure having approximately 4 such groups per 100 hydroxyl groups:

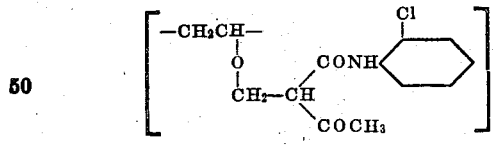

is washed and extracted with acetone and dried to give 25.5 parts of a white powder soluble in boiling water. This material when coated in place of the dye intermediate of Example I forms a hydrophilic layer and yellow negative dye images are obtained on exposure and development in like manner.

*Example VIII*

A solution of 25 parts of chloromethyl methyl ether in 60 parts of dioxane is added slowly to a suspension of 40 parts of sodium acetoacetanilide in 150 parts of dioxane. The mixture is stirred 15 minutes and filtered. The filtrate is diluted with 750 parts of water and allowed to stand for one hour. The precipitate is filtered, washed with water, dried, dissolved in 25 parts of dioxane, and added to a mixture of 22 parts of polyvinyl alcohol, 125 parts of dioxane, and 1 part of 85% phosphoric acid. The mixture is stirred at 80° for 6 hours, diluted with acetone, filtered, and extracted with acetone. The product obtained has a structure similar to that of Example VII, and when used in place of the dye intermediate ether of Example I, yields negative yellow dye images.

Example IX

A mixture of 28 parts of N-phenylacetoacetanilide, 3 parts of paraformaldehyde, 135 parts of dioxane is heated at 80° for one hour, then diluted with 300 cc. of water and extracted twice with ether. The ether solution is dried, filtered, and evaporated to about 25 parts, then dissolved in 50 parts of dioxane. This dioxane solution is added to a mixture of 20 parts of polyvinyl alcohol, 1 part of 85% phosphoric acid, and 150 parts of dioxane. The mixture is heated three hours at 75–80°, washed several times with acetone, and extracted. This product, namely, a polyvinyl ether containing approximately 1 group of the structure

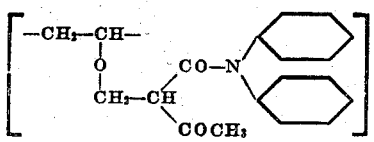

for each 20 hydroxyl groups when used in place of the polymeric color-former of Example I yields yellow negative dye images.

Example X

Thirty parts of a fast gelatin-silver iodobromide emulsion is melted at 40° and diluted with 300 parts of distilled water. This diluted emulsion is spun in a centrifuge until the silver halide has separated from the aqueous gelatin solution. After washing with warm water, 10 parts of this moist silver halide is dispersed in a solution of 10 parts of the hydrophilic polymeric dye intermediate ether of Example I dissolved in 200 parts of 20% ethanol-water. The resulting fast light-sensitive color-forming dispersion is coated on a cellulose nitrate base and dried. The resulting element is exposed to an object and processed as in Example I to yield a negative blue-green dye image.

Example XI

The light-sensitive coated films of the above examples are exposed and developed in a non-color-coupling photographic developer of the following composition:

|  | Parts |
| --- | --- |
| Water | 975 |
| p-N-Methylaminophenol sulfate | 2.5 |
| Sodium sulfite (anhydrous) | 75.0 |
| Hydroquinone | 3.0 |
| Sodium carbonate (anhydrous) | 30.0 |
| Potassium bromide | 2.0 | washed, re-exposed or chemically fogged, then exposed and processed as the film in Example I, whereupon positive color images of the same color are obtained.

Example XII

A monopack suitable for natural color reproduction is prepared by coating on a cellulose acetate film base the following composition: The light-sensitive dye intermediate ether composition of Example I which has been sensitized to the red region of the spectrum but not the green by a green-blind red sensitizer, e. g., a N,N'-diethyl naphthiocarbocyanine iodide. Over this is coated the light-sensitive composition of Example VI which has been sensitized to the green region with a sensitizing dye, e. g., erythrosin. Over this last mentioned layer is coated a layer of 70% hydrolyzed polyvinyl acetate containing a removable yellow filter dye to absorb blue light, e. g., tartrazine CI-640. Above this yellow filter layer is coated the blue-sensitive dye intermediate ether composition of Example VIII. This film element is exposed to a colored object scene whereby latent images representing different color component aspects in the different layers are formed. The film is then processed by the following steps:

1. Develop 10 minutes in an ordinary black and white developer such as that of Example XI.
2. Wash 10 minutes.
3. Re-expose to white light and reduce the residual silver salt by treatment for 15 minutes in the dye-generating developer of Example I.
4. Wash 10 minutes.
5. Bleach 7 minutes in a solution containing 3.5% potassium ferricyanide and made alkaline with ammonium hydroxide or sodium carbonate.
6. Rinse.
7. Remove bleached silver in a 25% solution of hypo (crystalline sodium thiosulfate).
8. Wash 15 minutes and dry.

The colored photograph resulting from the above process is of exceptional clarity and brilliance. The concentration of dyes and the definition is considerably greater than that obtained by use of previously known films.

Example XIII

A cellulose nitrate base is coated with the light-sensitive hydrophilic intermediate coating of Example III which has been sensitized to red light but not green by means of a green-blind sensitizing dye, e. g. pinacyanol. After drying, a layer of polyvinyl alcohol having butyral groups on 10% at the hydroxyl groups is coated on top of the emulsion, then dried, and the light-sensitive hydrophilic dye intermediate composition of Example VI which has been orthochromatized is coated and dried. Next is coated a layer of the above partial polyvinyl butyral containing a yellow (minus blue) filtering material, e. g., titanium ferrocyanide or 4-piperonyl butadienyl-alpha-pyridinium stearyl bromide (U. S. P. 2,255,077). Over this is coated the light-sensitive hydrophilic dye intermediate composition of Example IX. The resulting film is exposed to a colored object and treated by the development method of Example I to form a color negative in which all of the colors of the object scene are reproduced in their complementary color. This color negative is then printed onto an unexposed film of the same material using successive exposures of blue, green, and red light which are substantially complementary to the colors of the dyes generated in the layers and, after processing by the method of Example I, a color positive is obtained.

Example XIV

A heavy white paper having a baryta coating is coated as is the film of Example XII. This multilayer element is exposed under a color positive prepared as in Example XII and processed by the same means to a color positive. A piece of this same paper is used in place of the film of Example XIII as a printing stock and yields a multi-color positive having clear bright colors of good definition and freedom from stain.

Example XV

A film prepared according to Example I is exposed and developed in the developer of Example I. After development, the film is washed and placed in a diazo solution prepared as follows: 1.73 parts of 2-chloro-4-nitroaniline dissolved in 5 parts of concentrated sulfuric acid is mixed with 0.7 part of sodium nitrite dissolved in 5 parts of concentrated sulfuric acid and, after thoroughly mixing, the solution is poured with rapid stirring into a mixture of 600 parts of water and 400 parts of ice. Following this, 15 parts of sodium acetate and 7 parts of calcium hydroxide are added and the solution filtered at 0-5°. After 2 minutes in this solution, the film is placed in 1 molar hydrochloric acid at 5° for 5 minutes to wash out the excess of diazonium compound. The silver and developer coupling products are bleached by immersion for 10 minutes, at 15° in an aqueous solution containing 10% copper sulfate, 5% potassium bromide, and 5% concentrated hydrochloric acid. After washing, the film is fixed in a standard potassium alum-thiosulfate bath, washed, and dried to give a film containing a positive image in a brilliant yellow azo dye.

*Example XVI*

A film prepared according to Example III is exposed to an object, developed in a non-color forming developer of the type set forth in Example XI, washed, and dried. After re-exposure to white light, the film is developed in a solution containing 96 parts of water, 5 parts of 2% sodium oleate, 2 parts of phenylhydrazine, and 2 parts of sodium carbonate. The developed film, after washing, is bleached in 4% potassium ferricyanide and fixed. The film then contains a brilliant yellow positive azo dye image.

*Example XVII*

To a solution of 95 parts of 1-N-hydroxyethyl-aminonaphthalene in 500 parts of dioxan is added 15 parts of paraformaldehyde and 5 parts of 85% phosphoric acid. The mixture is stirred for 2 hours at 60°, then 200 parts of 95% hydrolized polyvinyl acetate (20 centipoise viscosity of 4% aqueous solution at 20° C.) is added and the mixture stirred at 75° for 2 hours, then 20 parts of phthalaldehyde acid is added and stirring at 75° C. continued for 1 hour. The mixture is diluted with 1000 parts of acetone, filtered, and the solid washed in 6 changes of 1000 parts each of acetone during 12 hours. Ten parts of the product, a mixed 1 - N - hydroxyethylaminonaphthyl ether/phthaladehydic acid acetal of polyvinyl alcohol is used in preparing an element by the method of Example I. This element is processed by the methods in Examples XV and XVI to yield brilliant magenta azo dye images.

*Example XVIII*

A mixture of 171 parts of p-nitrobenzyl bromide, 220 parts of polyvinyl alcohol which has a viscosity in 4% aqueous solution of 30 centipoises at 20°, 150 parts of potassium carbonate and 1000 parts of dioxan is stirred at 70° for 6 hours, then diluted with 1000 parts of ethanol and filtered. The solid material is washed in six changes of 1000 parts each of 80% ethanol during 12 hours, then filtered and dried. A solution of 200 parts of this polyvinyl alcohol containing approximately one p-nitrobenzyl ether group for each 10 hydroxyl groups dissolved in 1000 parts of 30% dioxan is reduced with hydrogen in the presence of platinum oxide catalyst at 50° then filtered and stirred at 20° for 12 hours with 50 parts of di-ketene. The product, a partial p-acetoacetaminobenzylether of polyvinyl alcohol, is precipitated with 1000 parts of acetone, filtered, washed with 1000 parts of acetone and dried. Ten parts of this material is used in preparing a light-sensitive element according to the method of Example I. After exposure and processing by the method of Example I, a positive yellow azomethine dye image is obtained. After exposure and processing by the methods of Examples XV and XVI, positive yellow azo dye images are obtained.

The novel elements of this invention are not limited in their utility to any one process of color photography. They may be used, for example, with various other color-coupling agents than those specifically described in the examples. Thus, they may be used with any color-coupling aromatic primary amino developing agents. Suitable specific developers of this type are described in U. S. Patent 2,297,732.

The preferred reaction for preparing these new color-forming binding agents involves formation through formaldehyde to give a compound having each of the color-forming nuclei attached through a methylene group to an ether oxygen which is in turn attached to a carbon of the linear carbon chain of the polymer. The color-forming nuclei need not, however, be attached directly to the methylene ether group. Non-color-forming formaldehyde reactive groups, e. g., amide, mercapto, or aliphatic amino or hydroxyl, may be present in the dye former and react with the formaldehyde to form methylol derivatives capable of condensing with the hydroxyl groups of the polymer to form ethers.

Alternatively, other etherification methods may be employed. In all of these compounds a bifunctional non-color-coupling radical may intervene between the ether methylene groups and the color coupling nuclei. Thus, the color-forming nuclei can be joined to the polymer chain through other ether groups such as

—OCH₂COX, —OCH₂CH₂X, —OCHRX,
—OCR₂X, —OCH₂—CH₂S—X,

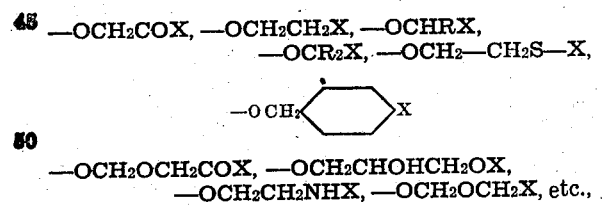

—OCH₂OCH₂COX, —OCH₂CHOHCH₂OX,
—OCH₂CH₂NHX, —OCH₂OCH₂X, etc., wherein the R groups are small alkyl radicals and X is a color-forming group as herein described by the following representative methods:

(1) The polyvinyl alcohol is stirred or milled with 10-20% aqueous sodium hydroxide and a color-former containing an aliphatic chloride, bromide or iodide group is added and the mixture stirred and warmed to split out hydrogen halide from the reactants thus connecting the color-forming nuclei to the polymer chain through an ether linkage, (2) a partial glycolic acid ether is formed by reaction of the hydrophilic polymer with chloroacetic acid and sodium hydroxide after which the carboxylic acid groups are converted to amides by reaction with color-forming compounds containing amino groups or (3) reduction of nitrobenzyl ethers of polyvinyl alcohol followed by reaction with color-former acid chlorides.

In place of any of the binding agents employed in the above examples, there may be used other dye intermediate ethers of polyvinyl alcohol and its substitution derivatives provided they have the previously described physical properties. Since different color-forming groups have different effects on the solubility and permeability, it is often necessary, in order to secure the desired properties, to employ polyvinyl alcohols of different viscosities and different solubilities. If a product is obtained which is to soluble, a higher viscosity material may be used, but if the polymeric dye intermediate ether is slightly too insoluble or impermeable, a lower viscosity polymer should be employed. Other useful methods of controlling the solubility and permeability include the substitution of a part of the polyvinyl alcohol hydroxyl groups with, for instance, ester, acetal, or ether groups which are free from dye intermediate nuclei. The presence of a minor portion of acetate groups, for instance, increases the solubility while larger amounts decrease the solubility. Acetal groups from acetaldehyde, butyraldehyde, benzaldehyde, etc., decrease water solubility and increase the solubility in organic solvents or solvent-water mixtures. To secure a greater insolubilizing effect, a small percentage of aromatic ester or acetal groups may be introduced. For example, if the product derived from polyvinyl alcohol is too soluble, one of the following derivatives can be employed: (1) 60–80% hydrolyzed polyvinyl acetate, (2) polyvinyl alcohol which has been up to 20% acetalized with butyraldehyde, (3) polyvinyl alcohol which has been up to 10% esterified with benzoic acid, (4) polyvinyl alcohol which has been approximately 5% acetalized with benzaldehyde or (5) polyvinyl alcohol which has up to 10% butyric ester groups. Such substitution can of course be introduced prior or subsequent to condensation of the dye intermediate or color former with the polymer.

If on the other hand, a greater solubilizing effect is desired, acidic salt-forming groups, e. g., sulfonic or carboxylic acid groups can be introduced either on the color-forming nucleus or by acetal formation with aldehyde acids, by partial esterification with dibasic acids or by ether formation with hydroxyacids, etc. for example, if the color former prepared from polyvinyl alcohol is too low in solubility, one of the following derivatives can be employed: (1) polyvinyl alcohol which has been up to 20% acetalized with phthalaldehydic acid, benzaldehyde orthosulfonic acid, glyoxylic acid, etc., (2) polyvinyl alcohol which has on 20% or less of the hydroxyl group half esters of phthalic, succinic, etc. acids, (3) polyvinyl alcohol which has been 20% or less esterified with glyoxylic acid. Such groups also can be introduced either before or after condensation of the color former with the polymer.

In addition to the color-forming or dye intermediate groups of the above examples, many of the other well known color formers or dye intermediates may be employed. Thus, the dye intermediate nucleus may be any phenol, naphthol or aromatic amine having a coupling position available ortho or para to the aromatic hydroxyl or amine group or any active methylene compound, i. e., a compound having a —CH₂— group activated by two unsaturated groups taken from the class of =CO, =CS, —C≡N, —NO₂,

—CONH—, —COO alkyl, —COO aryl, connected either directly or through a conjugated system. Such active methylene compounds are distinguished by their ability to have one of the hydrogen atoms of the methylene group replaced by alkali metals in an aqueous solution and include many acyclic and heterocyclic compounds known in the art. Examples of such active acyclic and intracyclic methylene compounds include (1) beta-ketoacylamides of the type RCOCH₂CONHR, where R is a hydrocarbon or heterocyclic radical and R, is preferably aromatic, e. g., benzoylacetanilide, p-nitrobenzoylacetanilide, p-nitroacetoacetanilide, naphthoyacetanilide, p-acetoacetamidobenzoic acid, furoylacetanilide, (2) pyrazolones, e. g., 1-phenyl-3-methyl-5-pyrazolone, 1-p-chlorophenyl-3-methyl - 5 - pyrazolone, 1-5-phenyl-3-carboxy-5-pyrazolone, 1-m-sulfophenyl-3-methyl-5-pyrazolone, (3) indoxyl and thioindoxyl, (4) N-homophthalylamines, e. g., N - homophthalylaniline, N - homophthalyl-n-dodecylamine, N-homophthalyl-beta-naphthylamine, (5) 2,4-dihydroxyquinoline, (6) p-nitrobenzylcyanide, (7) diketohydrindene, (8) malonamides, e. g., ethyl N-phenylmalonamate, N,N-diphenylmalonamide, (9) phenacylpyridinium bromide, (10) hydroxypyridine, (11) cyanoacetanilide, ethyl cyanoacetate.

In the method of preparing these polymeric color-forming binding agents employing formaldehyde to connect the color former to the polyvinyl alcohol chain, the formaldehyde may be in any form. Thus, it can be used as solid paraformaldehyde or dissolved or suspended in water or solvents for the color former, or as formaldehyde releasing compounds such as trioxane, hexamethylenetetramine, methylene diacetate. Compounds which form methylol derivatives such as chloromethyl ether may be used. Alternatively, dimethylol derivatives of amides, ureas, etc., e. g., dimethylolurea, dimethyloladipamide, dimethyloloxamide and their ethers such as bismethoxymethylurea may be used in place of formaldehyde for linking the dye intermediates to the polymer chain.

Multilayer films other than those described in the above examples may be prepared according to this invention. Thus, the layer for recording red light and producing the blue-green part image may be sensitized to green and red light both and protected by a green-absorbing red filter layer between it and the exposure, or the sensitive layers may be coated in a different order, or one of these layers may be on the other side of the support. In addition, the present invention can be applied to a two-color process by suitable selection of dye intermediate nuclei and sensitizing compounds. Further, the invention can be combined with other processes for producing colored photographic images. For example, in the case of a three-color film, two-color images may be produced on one side of the support by the process of this invention, whereas the remaining color image may be produced, for example, on the other side of the support by toning or on the same side by an imbibition process.

The term "hydrophilic" as used in this application and claims when referring to the dye intermediates, etc., is intended to denote compounds which in the form of thin layers, e. g., one to ten microns in thickness are insoluble in water at 20° C. but are freely water permeable.

These new hydrophilic polymeric dye intermediates are also useful as adjacent layers in operative contact with non-color-forming layers containing silver salt layers. Thus, it has been found that a layer containing silver salts dispersed in a non-color-coupling binding agent, e. g., gelatin, containing a latent or a silver salt image and having an adjacent coating of one of these color-forming polymers may be processed as in Examples I, XI, XII, XIII, XIV, XV or XVI above or by the other methods of color photography herein described to form colored images. Similarly, a multi-layer film may be prepared as in Example XII, using in place of each light-sensitive coating of that example a correspondingly color-sensitized layer of gelatin-silver halide emulsion and a layer of the color-forming polymer containing no silver salt. Although it has been proposed to do this with gelatin layers containing dispersed insoluble color formers, the new film-forming color formers of the present invention have advantages as herein discussed in color-forming strength, clarity, compatibility, film strength, and stability, which makes them greatly superior for such uses.

The new hydrophilic dye intermediate ethers hereof are also useful in the older method of color photography using gelatin. Thus, they may be dissolved in water or water-solvent mixtures and incorporated in gelatin-silver halide emulsions. The dye intermediate ethers being hydrophilic colloid binding agents and highly polymeric do not under these conditions wash out of or migrate in the gelatin emulsion.

An important advantage of the new film elements of this invention resides in the increased stability of the dye images formed. Another important advantage resides in the toughness of the light-sensitive layers. They are far superior to gelatin in this respect. Thus a gelatin coated film when bent sharply between the thumb and forefinger with the gelatin side out, breaks in two. The elements hereof, on the other hand, can be folded repeatedly without breaking or cracking of the layer.

A further advantage resides in the fact that the color-yielding layers produce the maximum color density obtainable from the amount of silver salt reduced by the color coupling developer. This admits of the saving of silver halides. The lower amount of silver halides is of major importance in multilayer films because the innermost layers receive light passing through layers intervening the source of light. The less silver halide the upper layers contain, the less scattering of light there is and the more light passes through the lower layers. This results in faster films having a higher degree of definition and resolution than is obtainable by the use of immobile color formers in gelatin layers.

Another important advantage lies in the fact that thinner coatings can be used. The layers are tougher than gelatin and have a higher concentration of silver salts than gelatin. Moreover, they are uniform and their sensitivity can be accurately controlled by adding carefully measured amounts of sensitizing agents.

The light-sensitive color-yielding coating compositions hereof are more stable than gelatin emulsions, are resistant to bacterial putrefaction and can be stored longer.

The products of this invention may have a wide utility in color photography. Not only may they be utilized as a direct taking stock in the color-development process as described in the above examples, but they are useful in duplicating or copying and making color prints on paper. Thus, the multilayer film of Example XII may be processed as in Example I to a color negative, then printed onto a similar film with white light or by exposure with blue, green and red light controlled by suitable filters adjusted to the spectral qualities of the dyes and color sensitizers, and the printed material again processed as in Example I to a color positive. Thus, any number of color positives may be produced from a single color negative. Similarly, by using the procedure of Example XII on both the taking and printing stocks, color positives can be produced by reversal. In this way also, any number of color prints can be produced. The color negatives or positives produced according to this invention can also be employed in securing separation negatives or positives by known processes of color separation. The multilayer films such as described in Examples XII, XIII, and XV can also be used as printing media by printing with suitable colored light from separation negatives or positives and proper processing as described above to yield color positives.

New film elements prepared according to this invention have broad utility in azo dye processing, providing that the proper dye-coupling nuclei are attached to the polymer chain. In U. S. P. 2,297,732 and application Serial No. 450,403 filed July 10, 1942, now U. S. P. 2,342,620, are described a method for producing azo dye images involving color development and azo dye coupling steps. When the dye-coupling nuclei of that invention are attached to the vinyl alcohol polymers to prepare products of the present invention, the film elements prepared from them may be processed to pictures containing azo dye images of exceptionally good quality, stability, and clarity by the method described in the above-mentioned patent.

These latter film elements are also useful in other azo processes. Thus, they may be employed with the hydrazine developers of U. S. P. 2,220,929 and in process of U. S. P. 2,339,213 whereby azo dyes are produced on color development with aromatic hydrazine reducing agents.

A film element of this latter type is also useful in the catalytic bleach process employing silver or silver salt images. Thus, the film after exposure and processing employing noncoupling developers to a film containing silver or silver salt images may be treated with a suitable diazonium compound to uniformly dye the layers in their appropriate colors. By use of the known catalytic bleach methods, this film may then be processed to a color negative or positive as desired.

In addition, these elements are useful in the known processes involving conversion of silver salt images to silver antidiazotate images followed by coupling to form azo dye images.

As many apparently widely different embodiments of this invention may be made without departing from the spirit and scope thereof, it is to be understood that the invention is not limited to the specific embodiments thereof except as defined in the appended claims.

What is claimed is:

1. A color-yielding element comprising a support bearing light-sensitive silver halides in a layer consisting of a hydrophilic dye intermediate ether of polyvinyl alcohol.

2. A color-yielding element comprising a support bearing a light-sensitive silver halide stratum and a coactive layer consisting of hydrophilic ether of polyvinyl alcohol with a dye intermediate taken from the class consisting of aromatic hydroxy, aromatic amino and reactive methylene compounds.

3. A color-yielding element comprising a support bearing at least one layer consisting of a hydrophilic dye intermediate ether of a polyvinyl alcohol, said ether having a plurality of dye intermediate groups each linked through a single oxygen atom to a polyvinyl alcohol chain and containing a group capable of reacting with a diazo compound to form an azo dye and with the oxidation products of a primary aromatic amino developing agent, and silver halides.

4. A color-yielding element comprising a support bearing at least one layer consisting of a hydrophilic dye intermediate ether of a polyvinyl alcohol, said ether having a plurality of dye intermediate groups each linked through a single oxygen atom to a polyvinyl alcohol chain and containing in one of its tautomeric forms an active coupling group of the structure

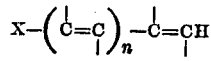

where X is taken from the group consisting of primary amino, secondary amino and —OH groups and $n$ is a number from the group consisting of 0 and 1 having a light-sensitive silver halide dispersed therethrough.

5. A color-yielding element comprising a transparent support bearing at least one layer consisting of a hydrophilic dye intermediate ether of a polyvinyl alcohol containing light-sensitive silver salts.

6. A color-yielding element comprising a support bearing at least one layer consisting of a hydrophilic dye intermediate ether of a polyvinyl alcohol, said ether having a plurality of dye intermediate groups each linked through a single oxygen atom to a polyvinyl alcohol nucleus and containing a group capable of reacting with a diazo compound to form an azo dye and with the oxidation products of a primary aromatic amino developing agent to form a dye selected from the group consisting of quinoneimine and azomethine dyes, having a light-sensitive silver halide dispersed therethrough.

7. A color-yielding element comprising a support bearing at least one layer consisting of a hydrophilic dye intermediate ether of a polyvinyl alcohol, said ether having a plurality of dye intermediate groups, each being linked through a single oxygen atom to the polyvinyl alcohol chain of atoms and each group containing in one of its tautomeric forms an active coupling group of the structure

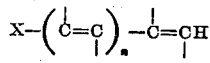

where X is taken from the group consisting of primary amino, secondary amino and —OH groups and $n$ is a number from the group consisting of 0 and 1, having a light-sensitive silver halide dispersed therethrough.

8. A photographic element comprising a support bearing at least one layer consisting of a hydrophilic ether of the formula

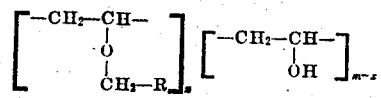

wherein $m$ is at least 100, $x = 1/100\,m$ to $\tfrac{2}{10}m$ and R is a dye intermediate nucleus containing in one of its tautomeric forms an active coupling group of the structure

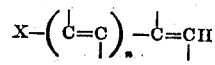

where X is taken from the group consisting of primary amino, secondary amino and —OH groups and $n$ is a number from the group consisting of 0 and 1, having a light sensitive silver halide dispersed therethrough.

9. A photographic element comprising a support bearing at least one layer consisting of a hydrophilic ether of the formula

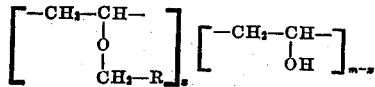

wherein $m$ is at least 100, $x = 1/100\,m$ to $\tfrac{2}{10}m$ and R is a dye intermediate nucleus containing in one of its tautomeric forms an active coupling group of the structure

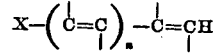

where X is taken from the group consisting of primary amino, secondary amino and —OH groups and $n$ is a number from the group consisting of 0 and 1, having a light-sensitive silver halide dispersed therethrough; said ether having at least 12.5 hydroxyl groups for every 100 chain atoms and at least one dye intermediate group for each 100 chain atoms and being soluble to at least 5% in water containing less than 25% of ethanol at boiling temperature.

10. A color-yielding photographic element comprising a support bearing at least one layer consisting of a hydrophilic ortho-hydroxybenzyl ether of polyvinyl alcohol having a light-sensitive silver halide dispersed therethrough.

11. A color-yielding photographic element comprising a support bearing at least one layer consisting of a hydrophilic 1-hydroxy-2-naphthyl ether of polyvinyl alcohol having a light-sensitive silver halide dispersed therethrough.

12. A color-yielding photographic element comprising a support bearing at least one layer consisting of a hydrophilic mixed 1-phenyl-3-methyl-5-ketopyrazyl ether/benzaldehyde-o-sulfonic acid acetal of polyvinyl alcohol having a light-sensitive silver halide dispersed therethrough.

ANDREW B. JENNINGS.

Certificate of Correction

Patent No. 2,397,865.        April 2, 1946.

ANDREW B. JENNINGS

It is hereby certified that errors appear in the printed specification of the above numbered patent requiring correction as follows: Page 1, second column, line 51, for "aminoethyl" read *aminoethenyl*; page 6, first column, line 47, for "phthalaldehyde" read *phthalaldehydic*; page 7, first column, line 8, for "to" read *too*; and that the said Letters Patent should be read with these corrections therein that the same may conform to the record of the case in the Patent Office.

Signed and sealed this 28th day of May, A. D. 1946.

[SEAL]

LESLIE FRAZER,
*First Assistant Commissioner of Patents.*